United States Patent [19]

Fukami

[11] Patent Number: 4,476,409
[45] Date of Patent: Oct. 9, 1984

[54] COILS OF CORELESS MOTOR AND METHOD OF MANUFACTURING THE SAME

[75] Inventor: Tadashi Fukami, Kanagawa, Japan

[73] Assignee: Oken Seiko Co., Ltd., Inagi, Japan

[21] Appl. No.: 437,355

[22] Filed: Oct. 28, 1982

[30] Foreign Application Priority Data

Oct. 30, 1981 [JP] Japan ................................. 56-172965

[51] Int. Cl.³ ............................................... H02K 3/00
[52] U.S. Cl. ..................................... 310/198; 310/154; 310/268
[58] Field of Search ................................. 310/198–208, 310/266, 154, 268, 40 MM, 267

[56] References Cited

U.S. PATENT DOCUMENTS

| | | | |
|---|---|---|---|
| 2,503,752 | 11/1950 | Malchus | 310/206 |
| 2,550,663 | 5/1951 | Bechberger | 310/208 |
| 3,191,081 | 6/1965 | Faulhaber | 310/154 |
| 4,093,882 | 6/1978 | Furuta | 310/154 |
| 4,320,319 | 3/1982 | Takahashi | 310/198 |
| 4,327,304 | 4/1982 | Aoki | 310/266 |

Primary Examiner—R. Skudy
Attorney, Agent, or Firm—Thompson, Birch, Gauthier & Samuels

[57] ABSTRACT

A coil for use in a coreless motor comprises a flat disc shaped portion in which a coil wire extends between two peripheral points which are spaced 180°, coil turns of the coil being successively displaced in a peripheral direction, and a cylindrical portion in which the wire is disposed to interconnect portions thereof at the peripheral edge.

The coil is manufactured by a winding machine having a winding head including a first disc and a freely rotatable second disc. The second disc has a diameter slightly larger than that of the first disc and acts as a guide. Each turn of the coil is wound across the upper surface of the winding head and about the same for about 180°. Adjacent turns are successively displaced a little in the peripheral direction. After winding, the coil is shaped into a cup shaped configuration.

3 Claims, 11 Drawing Figures (a)

(b)

COILS OF CORELESS MOTOR AND METHOD OF MANUFACTURING THE SAME

BACKGROUND OF THE INVENTION

This invention relates to a rotor coil utilized in a flat coreless motor and a method of manufacturing the same.

A conventional coil for use in a coreless motor comprises a plurality of elliptical coreless coils which are superposed in the vertical direction in a half lapped manner to form a disc shaped coil assembly. Such a coil assembly is difficult to manufacture, and moreover since its space factor is low the efficiency of torque generation is low.

SUMMARY OF THE INVENTION

It is an object of this invention to provide an improved coil for use in a coreless motor and a method of manufacturing the same, the coil being characterized by its simple construction, easiness of manufacturing and a high efficiency of torque generation.

According to one aspect of this invention, there is provided a coil for use in a coreless motor comprising a flat disc shaped portion in which a coil wire extends from one point along a peripheral edge of the flat disc shaped portion to a point on the peripheral edge about 180° spaced from the one point, the coil wire passing near a central portion, coil turns of the coil being successively displaced in a peripheral direction, and a cylindrical portion in which the wire is disposed to interconnect portions thereof at the peripheral edge.

According to another aspect of this invention there is provided a method of manufacturing a coil having a flat disc shaped portion and a cylindrical portion around a peripheral edge thereof, the method comprising the steps of providing a winding head including a first circular disc and a freely rotatable second circular disc having a slightly larger diameter than the first circular disc, disposing a coil wire on a upper surface of the winding head between a first point on a peripheral edge of the winding head and passing near a central portion and a second point of the peripheral edge about 180° spaced from the first point, bending the coil wire onto a peripheral surface of the cylindrical portion at the second point, moving the coil wire to the peripheral surface of the winding head from the peripheral edge of the second circular disc while rotating the same by about 180°, bending the coil wire onto the upper surface of the winding head at a third point near the first point, and repeating the winding operation described above so as to successively form respective turns of the coil with the turns sequentially displaced in the circumferential direction.

DESCRIPTION OF THE PREFERRED EMBODIMENTS

Figure 1:
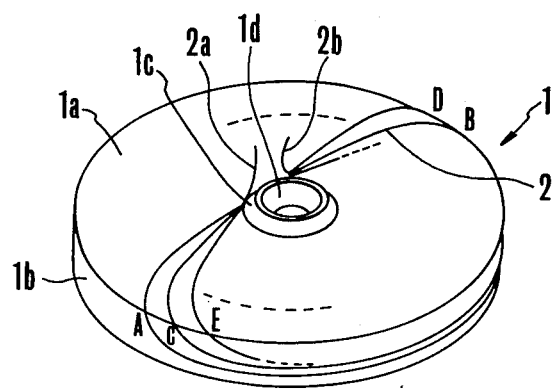
FIG. 1 is a perspective view of a coil for use in a coreless motor embodying the invention.

A coil 1 shown in FIG. 1 for use in a coreless motor comprises a disc shaped portion 1a and a short cylindrical portion 1b depending from the periphery of the disc shaped portion. A central opening 1d is provided at the center of the disc shaped portion 1a, the opening 1d being defined by central portion 1c thicker than the disc shaped portion 1a. The coil 1 is formed by winding a so-called "cement wire 2 comprising a copper wire coated with an insulating film and a binder film soluble in a solvent." Winding of the coil 1 is started by winding the wire 2 from the central portion of the disc shaped portion 1a, bent downwardly at a peripheral point A, wound about one half turn about the cylindrical portion 1b and finally bent up onto the disc shaped portion at a peripheral point B spaced 180° from the point A. Then, the wire 2 is wound in the radial direction of the disc shaped portion 1a to reach through the central portion 1c to a peripheral point C, about 180° spaced from the peripheral point B and slightly displaced from the peripheral point A. Thereafter, the wire 2 is bent downwardly and, wound about the cylindrical portion 1b, and bent upwardly at a peripheral point D slightly displaced from the peripheral point B to reach the upper surface of the disc shaped portion 1a. Then the wire 2 is brought to a peripheral point E slightly displaced from the point C after passing through the central portion 1c. At point E, the wire 2 is bent again downwardly and wound about the cylindrical portion 1b. By repeating the winding operation described above, the wire 2 is wound about the cylindrical portion 1b with respective turns sequentially displaced in the peripheral direction. Upon completion of the winding of the entire periphery, the wire 2 is brought to the central portion 1c to complete the coil 1. In FIG. 1, 2a and 2b designate coil ends, that is starting and finishing ends of the coil 1. Although not shown in the drawing, intermediate taps are provided for a predetermined number of turns about the periphery for connection to commutator segments of a commutator as will be described hereinafter. Where there are 7 commutator segments the intermediate taps are derived out at a spacing of about 51° (=360/7). For the sake of understanding, in FIG. 1, although respective turns of the coil 1 are shown considerably spaced apart, actually, the spacing are very small so that the turns are overlapped. More particularly, by making the amount of displacement in the peripheral direction of each turn to be smaller than the diameter of the wire 2, the coil 1 would have partially overlapped turns and the thicknesses of the disc shaped portion 1a and the cylindrical portion 1b become larger proportionally.

Figure 2:
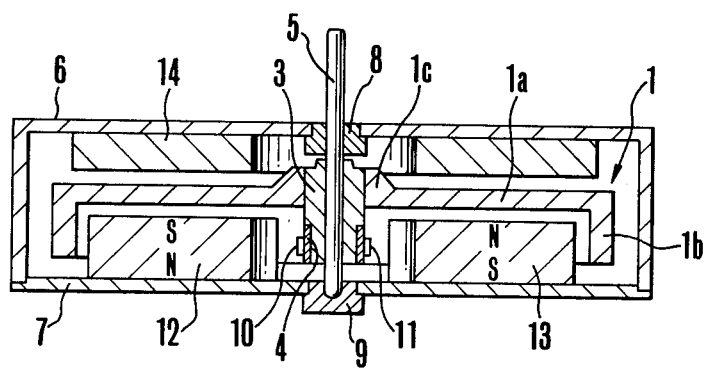
FIG. 2 is a sectional view showing a coreless motor utilizing the coil shown in FIG. 1.

As shown in FIG. 2, the motor comprises a cylindrical member 3 made of insulating material and bonded to the central opening 1d (not shown in FIG. 1) of the coil 1, and a plurality of commutator segments 4 supported by the cylindrical member 3, and a rotor shaft 5 inserted through the cylindrical member 3. These members constitute a rotor. The commutator segments 4 are respectively connected to the intermediate taps (not shown). The rotor shaft 5 is rotatably supported by bearings 8 and 9 secured to the center of casings 6 and 7 respectively. Brushes 10 and 11 respectively connected to the positive and negative terminals of a DC source are urged against the commutator segments. Sector shaped permanent magnets 12 and 13 are secured to the inner side of the casing 7, and an annular yoke 14 is secured to the inner side of the casing 6. The disc shaped portion 1a of the coil 1 is disposed in a space between the permanent magnets 12 and 13 and the yoke 14. Thus, when current is passed through the coil 1 via brushes 10 and 11, the rotor rotates in a given direction.

The method of manufacturing the coil 1 will now be described with reference to FIGS. 3 and 4.

Figure 3:
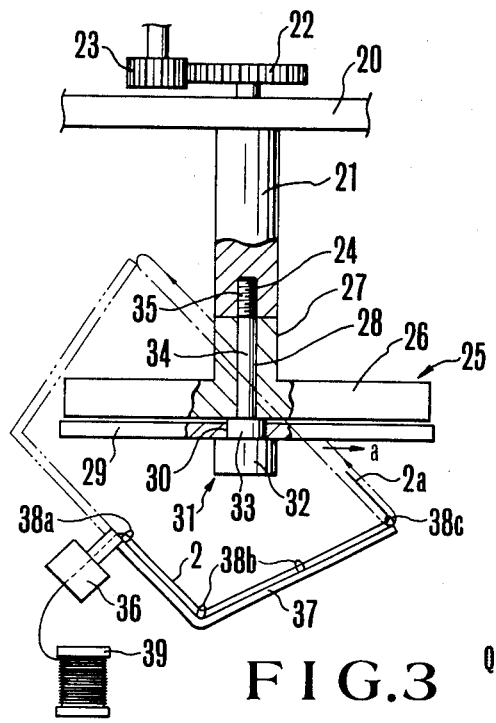
FIG. 3 is a front view, partly in section, showing a coil winding machine utilized to carry out the method of this invention.

The winding machine shown in FIG. 3 comprises a base plate 20 for rotatably supporting a vertical shaft 21, a gear 22 mounted on the upper end of the shaft 21 and meshing with a driving gear 23, a threaded opening 24 formed at the center of the lower portion of the shaft 21, and a winding head 25 having a cylindrical member 27 and a circular disc 26 with a central opening 28. The winding machine further comprises a circular disc 29 having a central opening 30 and acting as a guide plate, the disc 29 having a diameter slightly larger than that of the disc 26, a jig 31 having a head 32, a core 33 and a shaft 34, diameters thereof being successively reduced in the order mentioned, the upper end of the shaft 34 being formed with screw threads 35. There are also provided a winding motor 36, a substantially L shaped flyer 37 with one end secured to the shaft of the motor 36. The flyer 37 is provided with a plurality of guide rings at its opposite ends and at intermediate points. The wire 2 paid out from a bobbin 39, passes through a center opening of the shaft of motor 26 to reach a front end of the shaft and then the wire 2 is threaded through a guide ring 38a at one end of the flyer 37, and intermediate guide rings 38b and derived out through a guide ring 38c at the opposite end of the flyer 37. When the motor 36 is rotated, the free end of the flyer 37 passes along a passage as shown by dot and dash lines.

The winding head 25 and the guide disc 29 are secured to the shaft 21 by inserting the central core 33 into the center opening 36, inserting the shaft 34 into the central opening 28 and then threading the threads 35 into the threaded opening 24. Then the winding head 25 would be clamped between the jig 31 and the lower end that is the core 33 of shaft 21. However, since the axial length of the core 33 is larger than the thickness of the disc 29 a clearance in the axial direction is provided between the circular disc 26 and the guide disc 29 so that the disc 29 is free to rotate with respect to the shaft 34.

The winding head 25 is rotated at a constant low speed by the driving gear 23 via gear 22 and shaft 21.

The wire 2 is derived out through the guide ring 38c at the free end of the arm 37 and the starting end 2a of the coil 1 is secured to the cylindrical member 27. Thereafter motor 36 is started to commence the winding operation. Then, as shown by dot and dash lines, the wire 2 is wound obliquely with respect to the winding head 25.

After passing around the periphery of the cylindrical member 27, and on the upper surface of the disc 26, the wire 2 is bent onto the side surface of the circular disc 26 at the peripheral edge of the disc 26 (at a point corresponding to point A shown in FIG. 1). Since disc 29 has a diameter slightly larger than that of the disc 26, the wire 2 would be wound about the periphery of the disc 29. When the wire 2 is wound to the lower edge of the disc 29, the wire 2 would be pulled in a direction (shown by arrow a) to firmly surround the disc 29. When the disc 29 has rotated substantially 180°, the wire 2 is again brought on the periphery of the disc 26 so that the wire 2 moves from the disc 29 to the periphery of the disc 26 to be wound thereabout over about 180°. Then the wire 2 is bent upwardly at an edge point (a point corresponding to point B shown in FIG. 1). Then, the wire 2 is wound on the upper surface of the disc 26 through the peripheral surface of the cylindrical member 27. Since the winding head 25 is rotating at a low speed, the wire 2 is bent on the periphery at a peripheral point (a point corresponding to C shown in FIG. 1) which is slightly displaced from the first peripheral point (a point corresponding to point A shown in FIG. 1). Then, the wire is wound about the side surface of the disc 29 so as to cause it to rotate approximately 180° and then brought again on the periphery of disc 26. As above described, since the winding head 25 is rotating at a low speed, the wire will bent up again at a peripheral point (corresponding to D shown in FIG. 1) which is slightly displaced from the peripheral point (corresponding to point B shown in FIG. 1) at which the wire was bent previously. Thereafter, respective turns are wound in the same manner, with successive turns slightly displaced in the peripheral direction.

When, the winding head 25 completes one revolution, the wire 2 is wound continuously on the upper surface and the peripheral surface to a desired thickness. Taps are lead out at a predetermined spacing from intermediate points.

Upon completion of the winding operation, the jig 31 is removed and the completed coil is removed from the winding head 25. When the wire is wetted with a solvent before winding, the superposed turns of the coil can be bonded together into an integral body, thereby causing easy removal of the completed coil from the winding head 25.

Figure 4:
FIG. 4 is a sectional view showing a completed coil.

The density of the wire 2 is high at the central portion of the disc 26 but low at the peripheral portion so that the coil will have a sectional configuration as shown in FIG. 4.

Since the completed coil 1 is slightly deformed and has a sectional configuration as shown in FIG. 4, the following shaping operation is made.

Figure 5:
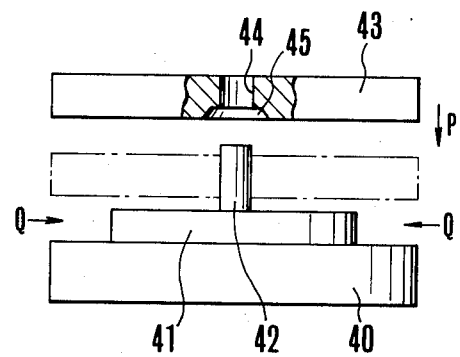
FIG. 5a is a side view showing upper and lower molds for shaping the coil.
FIG. 5b is a perspective view showing a side mold.
Figure 5:
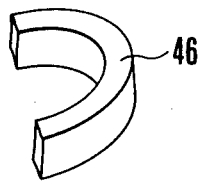

FIG. 5 (a) and (b) shows a shaping molding device comprising a lower mold 40, a core 41, an aligning shaft 42, an upper mold 43 having a central opening 44 and a recess 45, and side molds 46. After mounting a coil shown in FIG. 4 on the core 41 of the lower mold 40, the upper mold 43 is lowered as shown by arrow P to a dotted line position and the disc portion is shaped to have a predetermined thickness by applying pressure and heat. During the shaping, the central portion of the coil at which the wire density is high is received in the recess 45 of the upper mold 43 whereby a central projection having a large thickness is formed about the central opening of the coil. Then, two side molds 46 shown in FIG. 5(b) are inserted as shown by arrow a between upper and lower molds 43 and 40 to press the cylindrical portion of the coil thus shaping the same. At this time, uniform outer configuration can be obtained when the side molds 46 are successively displaced in the peripheral direction. With this shaping operation, a coil can be obtained having a configuration as shown in FIGS. 1 and 2.

Figure 6:
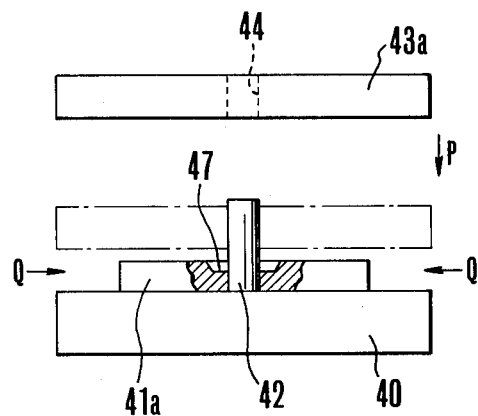
FIG. 6 is a side view showing a modified shaping mold.

FIG. 6 illustrates a modified shaping mold device comprising a upper mold 43a having only a central opening 44 and a core 41a having a recess 47 about the aligning shaft 42. Other parts are identical to those shown in FIG. 5.

This modified shaping mold is constructed to receive the central portion of the coil where the density of the wire is high in the recess 47. Accordingly, an axial projection is formed about the central opening of the coil.

Figure 7:
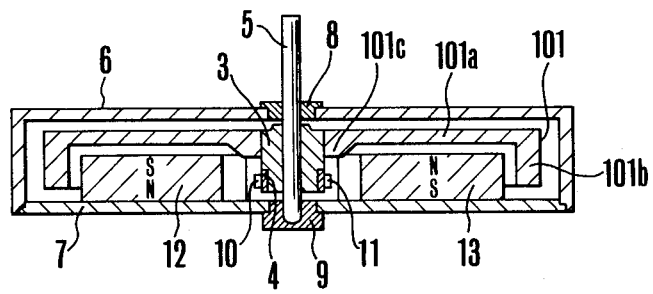
FIG. 7 is a sectional view showing a coreless motor incorporated with a coil shaped with the shaping mold shown in FIG. 6.
Figure 8:
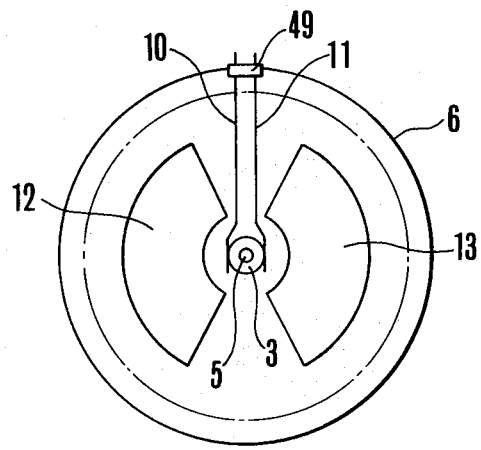
FIG. 8 is a plan view of the coreless motor shown in FIG. 7.

FIG. 7 is a sectional view of a coreless motor utilizing a coil shaped by the shaping mold shown in FIG. 6. In FIG. 7, elements identical or corresponding to those shown in FIG. 2 are designated by the same reference numerals. In this motor, since the upper surface of the disc shaped portion 101a of the coil 101 is flat, it is possible to dispose the casing 6 to face the disc shaped portion 101a with a small gap thus enabling to use the casing 6 as a yoke. For this reason, the yoke 14 shown in FIG. 2 becomes unnecessary, thus decreasing the axial thickness of the motor. The commutator 3 and the projection at the central portion 101c are disposed in a space between permanent magnets 12 and 13. Since these permanent magnets are properly spaced apart it is not necessary to provide an additional space for accommodating the projection. FIG. 8 is a plan view of the motor shown in FIG. 7. As shown, a supporting member 49 is provided for supporting brushes 10 and 11 insulated from the casing 6.

Figure 9:
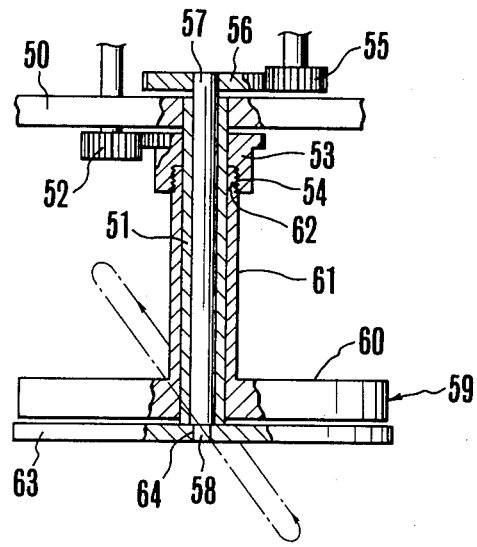
FIG. 9 is a front view, partly in section, showing a modified coil winding machine.

FIG. 9 shows a modified coil winding machine comprising a base plate 50, a sleeve 51 fixed to the base plate 50, a driving gear 52 driven at a predetermined low speed, a gear 53 rotatably supported by the bushing 51 and meshing with the gear 52, a threaded opening formed on the inner surface of the gear 53, a driving gear 55 rotated at a high speed, a gear 56 secured to one end of a central shaft 57 and meshing with the driving gear 55. Threaded portion 58 of a small diameter is formed on the opposite end of the central shaft 57. There are also provided a winding head 59 including a circular disc 60 and a cylindrical member 61 formed with a threaded portion 62 at its upper end and a circular disc 63 acting as a guide and formed with a threaded opening at its center. The disc 63 is rotated at substantially the same speed as the coil winding speed by the driving gear 55.

The winding head 59 is connected to gear 53 by fitting the cylindrical member 61 onto the shaft 51 and by threading the threaded portion 62 into the threaded opening. By inserting the threaded portion 58 into the threaded opening 64 the disc 63 can be mounted on the shaft 57.

The winding operation of the wire 2 is made in the same manner as in FIG. 3 provided that the disc 63 is rotated in a different manner. More particularly, in the example shown in FIG. 3, the disc can rotate freely so that it is automatically rotated by the pulling force applied thereto created by the engagement of the wire 2 with the peripheral surface of the disc. On the other hand, in the example shown in FIG. 9, as the wire engages the periphery of the disc 63, the wire is wound for about 180° about the periphery of the disc 63 rotated at substantially the same speed as the winding speed. The wire is then transferred to the disc 60 to be wound for about 180° about the periphery of the disc. Accordingly, the wire can be wound more positively and smoothly on the periphery of the disc 60 of the winding head 59 for about 180°.

Instead of continuously rotating the disc 63, it may be rotated intermittently for 180° at a timing of engaging the wire with the peripheral surface of the disc 63.

Figure 10:
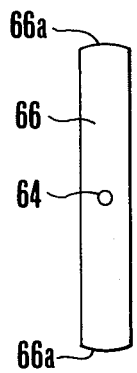
FIG. 10 is a side view showing a modified guide plate.

In the example shown in FIG. 9, where the rotational speed of the disc 63 is made to be equal to the coil winding speed, the position on the peripheral surface of the disc 63 at which the coil engages becomes substantially constant. Consequently, the guide plate is not required to be circular but may be a rectangular plate 66 as shown in FIG. 10. The guide plate 66 has side surfaces 66a engaging the coil wire 2. The side surfaces may be roughened to ensure positive engagement of the wire.

As above described the coil of this invention for use in a coreless motor has a simple construction and, since coil turns can be concentrated at a high density at the flat disc shaped portion, the space factor and the efficiency of generating torque can be improved with a simple winding operation.

What is claimed is:

1. A coil for use in a coreless motor, said coil comprising a plurality of successive angularly offset wire windings shaped into a flat circular disc portion with an integral cylindrical portion at the periphery thereof, each of said windings extending away from a central region of said disc portion over a first point on said periphery and onto said cylindrical portion, then approximately 180° around said cylindrical portion along a path substantially parallel to the plane of said disc portion, then over a second point on said periphery and back onto said disc portion, and then from said second point back towards said central region.

2. The coil according to claim 1 wherein said flat circular disc portion has a projection projecting in a direction opposite to said cylindrical portion.

3. The coil according to claim 1 wherein said flat circular disc portion has a projection projecting in the same direction as said cylindrical portion.

* * * * *